Feb. 9, 1971 P. G. BARTLETT ET AL 3,562,668

VARIABLE LOAD CONTROLLED BLOCKING OSCILLATOR POWER CONVERTER

Filed July 18, 1968 2 Sheets-Sheet 1

INVENTORS.
GARLAND E. FIESER &
PETER G. BARTLETT
BY
*Meyer, Tilberry & Body*
ATTORNEYS Feb. 9, 1971 P. G. BARTLETT ET AL 3,562,668

VARIABLE LOAD CONTROLLED BLOCKING OSCILLATOR POWER CONVERTER

Filed July 18, 1968 2 Sheets-Sheet 2

INVENTORS.
GARLAND E. FIESER &
PETER G. BARTLETT
BY
*Meyer, Tilberry & Body*
ATTORNEYS United States Patent Office
3,562,668
Patented Feb. 9, 1971

3,562,668

VARIABLE LOAD CONTROLLED BLOCKING OSCILLATOR POWER CONVERTER

Peter G. Bartlett, Davenport, Iowa, and Garland E. Fieser, East Moline, Ill., assignors, by mesne assignments, to Gulf + Western Industries, New York, N.Y., a corporation of Delaware Filed July 18, 1968, Ser. No. 749,559
Int. Cl. H03b *3/14;* H03k *3/30*
U.S. Cl. 331—109 8 Claims

ABSTRACT OF THE DISCLOSURE

There is provided a high power, current limited, voltage regulated power converter suitable for printed circuit board mounting. A normally clamped oscillator operates as a high frequency switching circuit and it is controlled by an actuatable oscillator control circuit. The operating frequency of the oscillator is controlled so as to provide a DC output level which is maintained at a predetermined level. Under a clamped condition, usually at no load, the frequency required to give this level is the lower operating frequency limit. A comparison circuit continuously compares the DC output voltage with a predetermined level set by reference setting circuit. Should the DC output voltage start to fall below the predetermined level, a voltage signal is produced by the comparison circuit. This voltage signal is directed to the oscillator control circuit to unclamp the oscillator to oscillate at a frequency necessary to restore the output voltage to the predetermined voltage level.

The present invention relates to a power converter and particularly to a blocking oscillator circuit for converting an AC input voltage to a selected DC output voltage.

The present invention is particularly adapted for printed circuit board mounting for use with solid state computers by the utilization of a high frequency switching circuit, and it will be discussed with particular reference thereto; however, the invention has somewhat broader applications and it may be used wherever the need arises for a selected DC output voltage.

Some voltage regulators employ an L.C. filter and oscillate at the natural frequency of the filter whenever the output load is suddenly changed. To combat a fluctuation in these regulators, some prior art circuits utilize current pulses emitted to output capacitor banks whenever the output voltage drops to a preselected lowest desired output voltage. Such prior art circuits do not provide for operation at varying frequencies, nor do they take advantage of a reduction in size of the various components to be used in such regulators, by the selection of the frequencies at which such regulators should operate.

Other prior art circuits provide a switch in the form of a transistor, causing the transistor to be conducting or nonconducting in dependence upon the actual potential of the supply line. These circuits include a feedback network to sense the actual potential of the supply line. Variations in the voltage of the source or in the current drawn from the supply line cause the feedback network to operate. Such arrangements necessarily include a filter circuit connected between the transistor and the supply line to effect a smoothing. Some difficulty with such a filter circuit is damage to the transistor because of the tendency of large currents to flow through the transistor when it first becomes conducting if the filter has a capacitor input, and difficulty in causing the transistor to become nonconducting quickly if the filter has an inductive input, as the inductance tends to cause the current to continue to flow in the transistor.

This invention contemplates overcoming the limitations as outlined above by providing a power converter utilizing high frequency switching, with a resultant reduction in component size and superior efficiencies made possible by this high frequency switching, as opposed to linear circuits. This invention also utilizes variations in a load circuit to control an oscillator, under control of an actuatable control circuit, to vary the oscillator frequency so that power only to a predetermined level is delivered to the load circuit to thus protect the system against damage should a short circuit develop in the load circuit. Also, the present invention incorporates a comparison circuit which provides a reference voltage which is stable over a wide temperature range. Therefore, a high current, current limited and voltage regulated compact power supply, suitable for printed circuit board mounting, is disclosed herein.

In accordance with the present invention, there is provided a power supply circuit including: a blocking oscillator for producing a series of oscillating voltage pulses between an upper frequency F2, when operating under its free running condition, and at a lower frequency F1, when operating under a clamped condition; an actuatable oscillator control means for normally clamping the oscillator and, upon actuation, serving to unclamp the oscillator; output circuit means coupled to the oscillator for providing an output voltage level therefrom and adapted to be coupled to a load which effects the character of the output voltage level in dependence upon the power consumption of the load; and, a comparison means coupled to the output circuit means for comparing the output voltage level with a reference voltage level and for actuating the oscillator control means each time the output voltage level differs from the reference voltage level.

The primary object of this invention is the provision of an apparatus for obtaining voltage regulations by utilization of high frequency switching.

Another object of this invention is the provision of an apparatus wherein a small pulse transformer can be used to produce a relatively high power output.

Another object of this invention is the provision of an apparatus wherein reduction in size of the components used for producing the oscillating frequency is achieved.

Another object of this invention is the provision of an AC to DC power converter that is small, light weight, and thus suitable for printed circuit board mounting.

Another object of this invention is the provision of a power converter which utilizes only flyback voltage of a pulse transformer to generate power for an attached load.

Another object of this invention is the provision of a power converter whose operating frequency is dependent upon the power demand of an attached variable load, going from a clamped condition to a full load condition in $\frac{1}{16,000}$ of a second.

Another object of this invention is the provision of a power converter whose operating frequency varies from 300 cycles per second when clamped to 16,000 cycles per second, when free running at maximum load.

Another object of this invention is the provision of a reference voltage which is stable over a wide temperature range.

These and other objects of the invention will become apparent from the following description of the specific examples embodying the invention and the attached claims when taken in conjunction with the accompanying drawings illustrating the described specific example embodying the invention in which:

DESCRIPTION

Figure 1:
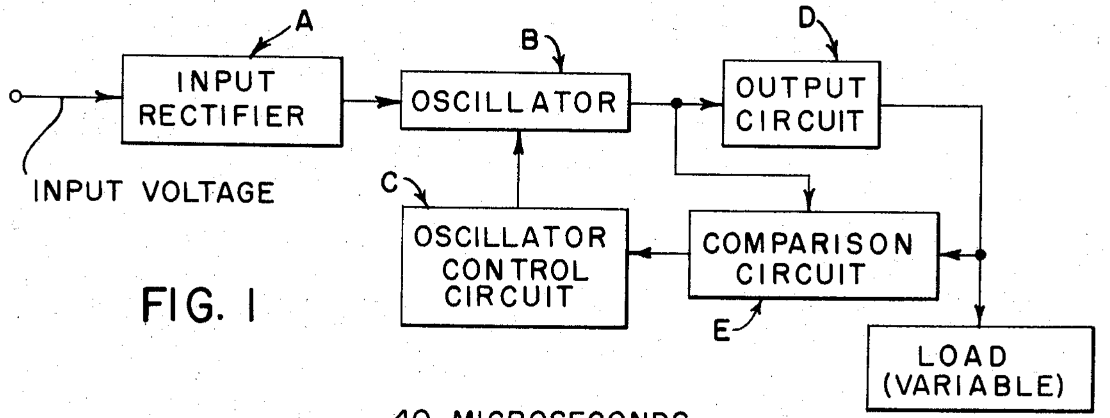
FIG. 1 is a block diagram of the power converter constructed in accordance with the present invention.

Referring now to the drawings which are for the purpose of illustrating a preferred embodiment of the invention and not for the purpose of limiting the same, a circuit constructed in accordance with the invention is illustrated in block form in FIG. 1.

As illustrated in FIG. 1, the power converter of this invention has an input line voltage, preferably 115 volts, 60-cycle AC, impressed upon an input rectifier circuit A wherein the line voltage is rectified to a high voltage DC, of the magnitude of minus 170 volts. This rectified high voltage DC is fed into oscillator B, which is operating as a switching circuit, so as to produce a series of pulses constituting a low voltage, high frequency AC. Oscillator B, in the embodiment shown, can operate at a frequency ranging from a minimum 300 to a maximum 16,000 cycles per second because of the inherent characteristics of the components selected and used. At the lower stated frequency, oscillator B is in a clamped condition and the operating frequency is due to its inherent characteristics. It may operate at any frequency within the stated range depending upon the activation thereof by an actuatable oscillator control circuit C which is connected to oscillator B. Control circuit C activates oscillator B, so as to determine its frequency of operation, under the influence of the power demands of the load which may be attached to the power converter at that particular time.

The series of pulses constituting the low voltage AC produced in oscillator B is fed to an output circuit D where the pulses are rectified and filtered so as to produce a low voltage DC output suitable for powering the load which may be attached to the power converter. The design of the power converter is such that oscillator B operates at a frequency necessary to maintain the DC output from output circuit D at a prescribed voltage level.

A comparison circuit E, connected to oscillator B, oscillator control circuit C and output circuit D, continuously compares the low voltage DC output from output circuit D with a predetermined reference voltage level set within comparison circuit E. Whenever the low voltage DC output from output circuit D falls below this predetermined reference voltage level, this is immediately sensed by comparison circuit E and a signal is generated by the comparison circuit. This generated signal from comparison circuit E is fed to oscillator control circuit C, actuating the osicllator control circuit, which in turn unclamps oscillator B, causing it to operate at a frequency higher than the 300 cycles per second defining the clamped operating frequency. Once unclamped, oscillator B generates the AC voltage pulses at a frequency necessary to restore the DC output voltage to the prescribed level.

When the DC voltage again reaches the prescribed reference voltage level, oscillator B is again clamped so as to operate at the clamped frequency of 300 cycles per second. It will be appreciated that this lower frequency may be varied, depending upon the characteristics of the components making up the oscillator.

Figure 4A:
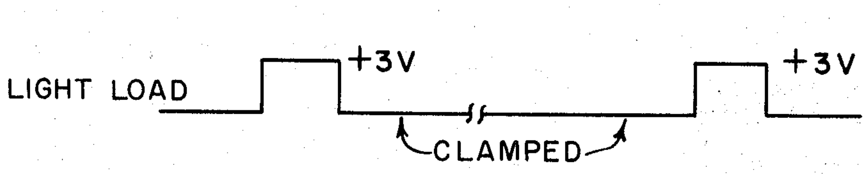
FIGS. 4A through 4C illustrate the output wave forms at point "*a*" of the load circuit of the power converter when supplying power to varying loads which may be attached to the power converter.
Figure 4B:
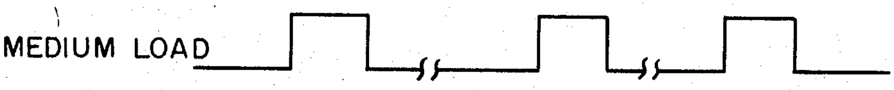
Figure 4C:
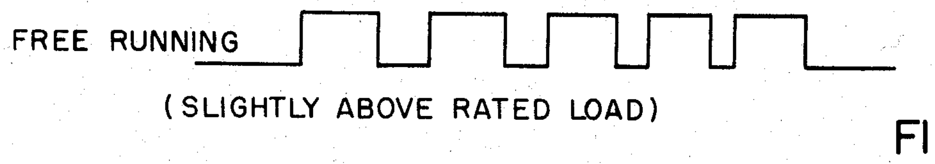

This cycle of comparing, unblocking, increasing the oscillator operating frequency, and blocking again, takes place at a frequency sufficient that the prescribed DC voltage output level remains relatively constant, independently of the power demands of the attached load. As detailed, under the clamp and no load condition this frequency is 300 cycles per second for the embodiment disclosed herein. At the rated full load, this frequency is 16,000 cycles per second maximum. The operating frequency of the disclosed power converter, therefore, is between 300 cycles per second and 16,000 cycles per second. FIGS. 4A through 4C are illustrative of the variable frequency output voltage pulses showing how they are dependent upon the varying power demands of any load that may be attached to the power converter.

Figure 2:
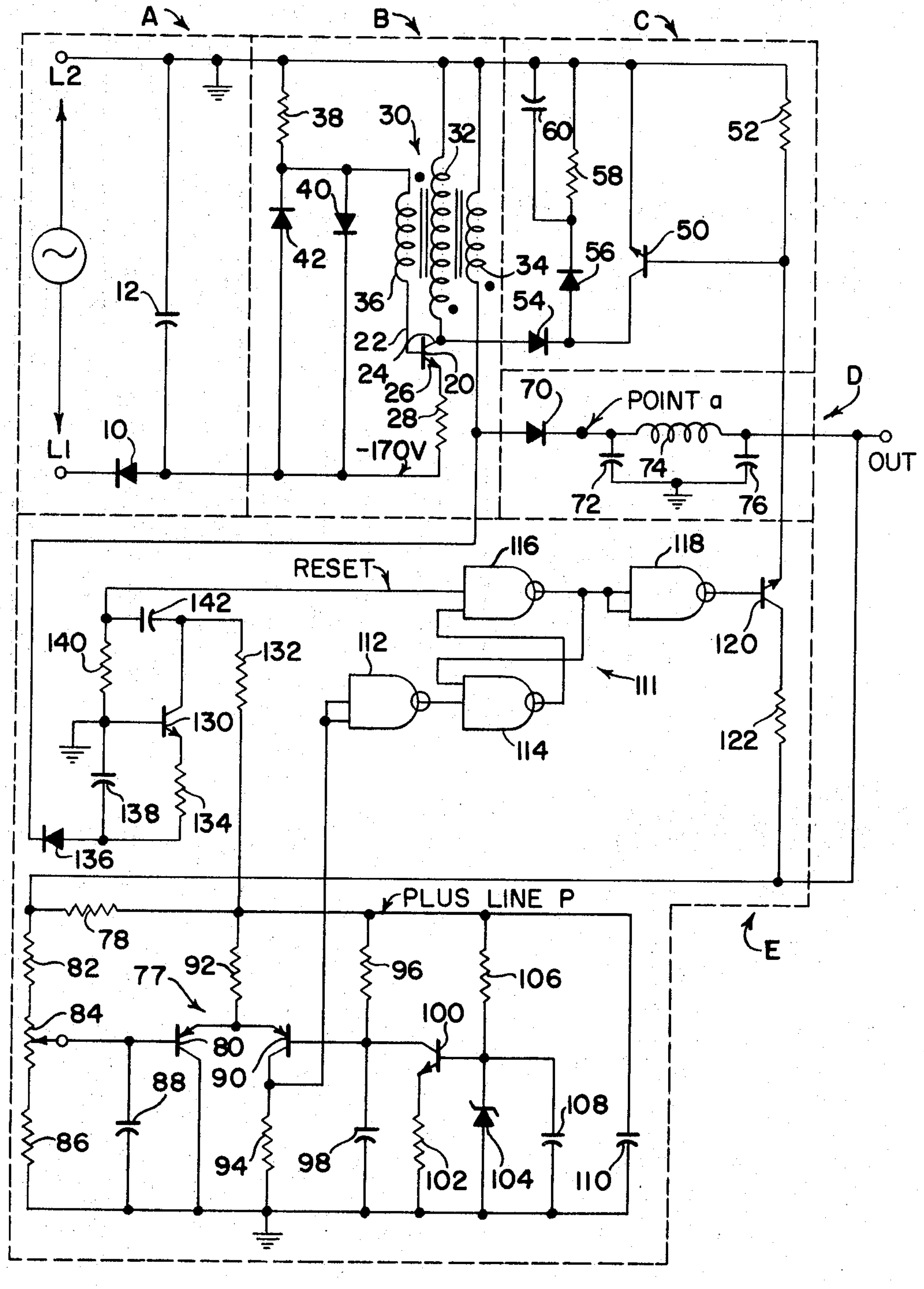
FIG. 2 is a schematic diagram of a power converter constructed in accordance with the present invention.

FIG. 2 is a schematic diagram of the power converter constructed in accordance with the present invention, and the construction of the individual components is detailed in what follows.

INPUT RECTIFIER

Input rectifier A is a simple series diode, shunt capacitor type rectifier and filter circuit. The 115 volts, 60-cycle line leads, L1 and L2, are wired across a diode 10 and a capacitor 12 with the anode of diode 10 connected to one plate of capacitor 12. The output of this line input rectifier A is a minus 170 volts DC, which is measured from the junction of diode 10 and capacitor 12 to lead L2, which in the preferred embodiment is wired to ground. Capacitor 12, in the preferred embodiment shown, is a 200-microfarad, 250-working volt DC capacitor. To further reduce the physical size of the power converter of this invention, a full wave bridge rectifier could be used that would require a filter capacitor of only approximately one-third of the present size of the filter capacitor now being used.

OSCILLATOR

Oscillator B, operating as a high frequency switching circuit, is energized by the minus 170 volts DC from input rectifier A. Included in oscillator B is an NPN transistor 20 having a base 22, a collector 24 and an emitter 26, with emitter 26 connected to the minus 170-volt terminal of the power supply through a current limiting resistor 28.

Also included in oscillator B is a pulse transformer 30 serving as an energy storing means, having a primary winding 32, an output winding 34 and a feedback winding 36, all having the polarities indicated by the polarity dots. Primary winding 32 is connected from ground to collector 24 of transistor 20, with the polarity indicated terminal of winding 32 wired to collector 24, whereas one end of output winding 34 is also connected to ground and the other end of output winding 34, the polarity indicated terminal, is connected as the oscillator output, as will be explained subsequently.

A resistor diode network consisting of a resistor 38 and two diodes 40 and 42 provide a control bias voltage for base 22 of transistor 20 through feedback winding 36. One end of resistor 38 is connected to ground and the other end of resistor 38 is connected to the junction of the anode of diode 40 and the cathode of diode 42. Also connected to this junction of diodes 40 and 42 is the polarity indicated terminal of feedback winding 36. The cathode of diode 40 and the anode of diode 42 are both wired to the minus 170-volt terminal of input rectifier A.

The resistor diode network of resistor 38 and diodes 40 and 42 and NPN transistor 20 serve as part of a charging circuit that permits energization of transformer 30.

OSCILLATOR CONTROL CIRCUIT

Oscillator control circuit C serves as another part of the charging circuit, and serves, when actuated, to unclamp oscillator B, thereby controlling the flyback of transformer 30, after energy has been stored therein.

Oscillator control circuit C includes an NPN transistor 50 whose emitter is connected to ground. A base biasing resistor 52 is connected in parallel across the base and the emitter of transistor 50. Connected to the collector of transistor 50 is the cathode of a flyback suppression diode 54. The anode of diode 54 is connected to collector 24 of transistor 20 and the polarity indicated end of primary winding 32. A voltage setting circuit, consisting of a diode 56 and a parallel circuit of a resistor 58 and a capacitor 60, is connected from ground to the cathode of diode 54. Diode 56 has its anode connected to the cathode of diode 54, and its cathode connected to the junction of one end of resistor 58 and one end of capacitor 60, with the other ends of both resistor 58 and capacitor 60 wired to ground.

OUTPUT CIRCUIT

Output circuit D is a simple series rectifier and shunt capacitor arrangement with a choke coil and a capacitor filter connected thereto. Output circuit D rectifies and filters the generated voltage output from output winding 34, so as to produce the low voltage DC suitable for powering the load which may be attached to the power converter.

The simple series rectifier and shunt capacitor arrangement has a diode 70 and a capacitor 72 wired in series between the output terminal of output winding 34 and ground, with the anode of diode 70 connected to output winding 34. The junction of diode 70 and capacitor 72, designated as point "*a*," is connected to one end of a choke coil 74. The other end of choke coil 74 is wired to ground through a capacitor 76. The output voltage of the power converter is taken from the junction of choke coil 74 and capacitor 76, and is indicated as a terminal labeled OUT.

COMPARISON CIRCUIT

A comparison circuit E is composed of voltage reference and regulated circuitry suitable for sensing a difference between a predetermined voltage reference level and the output voltage produced by output circuit D, and for controlling of the actuation of oscillator control circuit C, so as to regulate the output power of the power converter. Comparison circuit E utilizes a conventional differential amplifier and an actuating circuit, incorporating a NOR latch, for controlling the actuation of oscillator control circuit C by means of a control signal generated in the comparison circuit.

A differential amplifier 77 is connected to the output voltage terminal OUT through a series resistor 78, to define a voltage plus line P. Differential amplifier 77 includes two PNP transistors 80 and 90, whose emitters are paralleled and wired through an emitter bias resistor 92 to the terminal of resistor 78 defining the voltage plus line P. The collector of transistor 80 is wired directly to ground, whereas the collector of transistor 90 is wired to ground through a voltage setting resistor 94, whose purpose is to permit a control signal to be sensed at the junction of resistor 94 and the collector of transistor 90.

The base of transistor 80 is wired to the terminal OUT through a variable resistor 84 and a fixed resistor 82, with the movable arm of resistor 84 being connected to the base of transistor 80 and with one terminal of resistor 84 being connected to resistor 82. The other terminal of resistor 84 is connected to ground through a bias setting resistor 86, whereas a parallel capacitor 88 jumpers the movable arm of resistor 84 and also resistor 86 to ground.

Connecting plus line P to the base of transistor 90 is a resistor 96, whereas a capacitor 98 connects the base of transistor 90 to ground. An NPN amplifying transistor 100 has its collector wired to the base of transistor 90 and its emitter connected to ground through a resistor 102. A voltage reference setting Zener diode 104 is wired in series with a resistor 106 across plus line P and ground, with the anode of Zener diode 104 connected to ground. The junction of Zener diode 104 and resistor 106 is connected directly to the base of transistor 100, and also to ground through a capacitor 108. A capacitor 110 serves as a jumper from plus line P to ground.

A latching circuit, incorporating a NOR latch 111, connects the output of differential amplifier 77 (taken from the junction of the collector of transistor 90 and resistor 94) to oscillator control circuit C. NOR latch 111 is composed of four double input NOR units, which are input unit 112, second unit 114, third unit 116 and output unit 118.

The collector of transistor 90 is connected to both inputs of unit 112, the output of unit 112 being connected to one input of second unit 114, and the output of units 114 and 116 being connected in latch-back configuration to one input of each other. The output from third unit 116 is also connected to both inputs of output unit 118. A reset line is wired as the second input to third unit 116. Connected to the output of unit 118 is an NPN transistor 120, with its base wired to such output of unit 118, its collector wired to output terminal OUT through a resistor 122 and its emitter wired to the base of transistor 50 of oscillator control circuit C.

The reset line into unit 116 of NOR latch 111 is a connection from a reset circuit, which includes an NPN transistor 130 whose collector is wired to plus line P through a resistor 132. The emitter of transistor 130 is wired to the junction of output winding 34 and the anode of diode 70 through a series combination consisting of a resistor 134 and a blocking diode 136, the anode of diode 136 being connected to one end of resistor 134 with the other end of resistor 134 being connected to the emitter of transistor 130. The base of transistor 130 is wired to ground, with a capacitor 138 jumpering the base of transistor 130 to the junction of resistor 134 and diode 136. A series circuit of a resistor 140 and a capacitor 142 jumpers the base to collector of transistor 130, the free plate of capacitor 142 being connected to the collector of transistor 130. The reset line connection to the one input of third unit 116 of NOR latch 111 is taken from the junction of resistor 140 and capacitor 142.

OPERATION

Basically, the power converter of this disclosure is directed to an apparatus for obtaining a high current, current limited, voltage regulated, compact power supply particularly adapted for printed circuit board mounting. An input voltage of 115 volts, 60-cycle AC is rectified and filtered, and the resultant high voltage DC is fed into a high frequency switching circuit, cycling between 300 and 16,000 cycles per second, depending upon the demands of the load which may be attached to the power converter. The output of the switching circuit is approximately four volts, which is rectified and filtered, and the resultant voltage is then fed into sensing and voltage reference circuits. The sensing and voltage reference circuits compare the filtered low voltage DC with a predetermined reference voltage, and unclamp the switching circuit whenever the filtered low voltage DC drops lower than the set reference voltage, thus permitting the power converter to compensate for the power demands of any load attached to the power converter. This power converter is specifically designed to take advantage of the reduction in sizes of the load filter capacitor and energy storing transformer, and the superior efficiencies made possible by the use of high frequency switching circuits as compared to linear circuits.

Referring now to FIG. 2, the AC supply line of 115 volts is impressed across lines L1 and L2 of input rectifier A. Diode 10 rectifies this AC voltage to a negative DC voltage, and capacitor 12 filters the rectified DC voltage, with the result that minus 170 volts DC, with respect to ground, is impressed across oscillator B, which operates as a high frequency switching circuit in the embodiment disclosed. Line L2 is used as the ground side of the power converter disclosed herein.

Transistor 20 serves as the high frequency switch for oscillator B, with a charging circuit permitting oscillator B to be free running. Resistor 38 and diode 40 provide a control bias for base 22 of transistor 20 through feedback winding 36 of pulse transformer 30. The base drive current for transistor 20, when it is in conduction, is supplied across resistor 38, and maximum conduction of the current through resistor 20 is controlled by resistor 28.

Conduction through transistor 20 commences with the application of the minus 170 volts DC across oscillator B. The application of this negative voltage sets the forward bias for base 22 to the level to cause conduction to begin in transistor 20.

Pulse transformer 30 serves to store the energy for oscillator B. The primary winding 32 of pulse transformer 30, being connected to the collector of transistor 20, will begin to store the voltage charge when transistor 20 begins conduction, inducing voltages in output winding 34 and in feedback winding 36 of the polarity indicated by the polarity dots. Transformer 30 will be driven to saturation when transistor 20 is made to conduct fully, under the regenerative action of feedback winding 36. As transformer 30 is being driven to saturation, energy is stored within primary winding 32, and when transformer 30 has been driven to saturation, the energy stored within winding 32 begins to discharge, or flyback, causing a reversal of the induced voltages in output winding 34 and in feedback winding 36. The reversal of the induced voltage in feedback winding 36 tends to overcome the control bias set by resistor 38 and diode 40, and conduction within transistor 20 is stopped. This cycle is repeated as long as power is supplied to the power converter. When oscillator B is clamped, the repetitive rate of these cycles is 300 cycles per second because of the inherent characteristics of the components that make up the oscillator.

Figure 3:
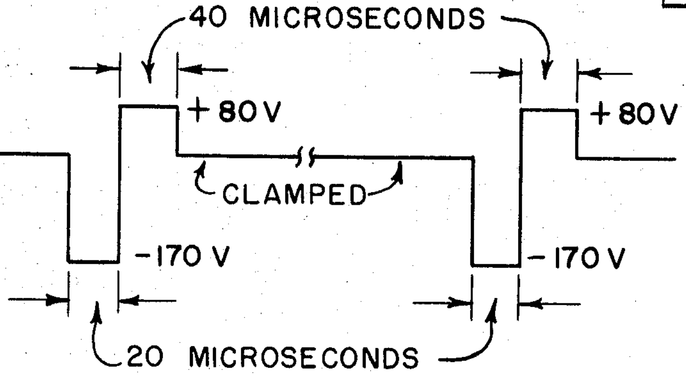
FIG. 3 illustrates the output wave form of the primary winding of the power converter embodying the present invention.

These cycles are shown by FIG. 3, which is illustrative of the voltage pulses at collector 24 of transistor 20 and which is representative of the induced output voltage from output winding 34. In the embodiment shown, the winding ratio between primary winding 32 and output winding 34 is a step down relationship of 20 to 1. For primary winding 32, the wave form represents a deflection from approximately ground to a minus 170 volts (approximately) and then to a control plus 80 volts (flyback voltage). This flyback voltage is limited to plus 80 volts by flyback suppression diode 54, diode 56 and the parallel combination of resistor 58 and the capacitor 60 wired to ground. For output winding 34, therefore, with the designated 20 to 1 stepped down relationship, the wave form represents a deflection from approximately ground to minus 8.5 volts (approximately) and then to plus 4 volts (flyback voltage). As can be seen, output circuit D passes the plus flyback voltage only, because of the positive facing diode 70 (see FIG. 2). Since there is a one-volt drop in diode 70, because of the inherent characteristics of the diode used, the resultant output voltage at point *a* is a nominal plus 3 volts.

By selecting the frequency range within which the power converter is to operate, the transformer size can be reduced to any size desired, since the transformer size is directly proportional to frequency. Therefore, by selecting a frequency range with a maximum of 16,000 cycles per second, a pulse transformer of reduced size can be utilized contributing to the overall reduction in physical size of the power converter, thus making the power converter suitable for printed circuit board mounting. Also, since primarily all transistors included in the power converter are operated in the switching mode, transistor size is also held to a minimum.

Oscillator control circuit C controls the frequency of oscillator B by controlling the flyback voltage of primary winding 32. When transistor 50 is conducting, any flyback voltage generated in primary winding 32, and hence in output winding 34, is effectively clamped back to ground through flyback suppression diode 54 and transistor 50. Therefore, the output voltage generated in output winding 34 is clamped to approximately ground. When transistor 50 is not conducting the flyback voltage generated in primary winding 32 is allowed to flyback (up to plus 80 volts), and output voltage pulses are generated by oscillator B, supplying power to any load attached to output circuit D because of the inducing effect of the flyback voltage generating plus 4 volts in output winding 34.

By clamping primary winding 32 back to ground, any output voltage pulse from oscillator B is effectively clamped and the operating frequency of the power converter can thus be controlled. How oscillator control circuit C is controlled by comparison circuit E will be explained subsequently.

As previously stated, the frequency of voltage generation of oscillator B is a function of the operation of oscillator control circuit C, and since the conduction time of the oscillator is determined by the saturation time of transformer 30, the operating frequency range of the power converter, as a whole, is a function of the two, primarily influenced by the power demands of the loads that may be attached to output circuit D.

With the transformer 30, as selected, the saturation time of primary winding 32 of the transformer is 20 microseconds, with the formula:

$$V_1 \times S_1 = V_2 \times S_2$$

where:

$V_1$=saturating voltage—transistor 20 conducting
$S_1$=time conducting—saturation
$V_2$=voltage output (assume clamped to one volt because of diode 54)
$S_2$=time dissipating—flyback The flyback time of primary winding 32 of transformer 30, when transistor 50 is conducting (oscillator B clamped), using the above stated formula with the proper substitution of values therein, would be approximately:

$$170V \times 20 \text{ microseconds} = 1 \text{ volt} \times S_2$$

$S_2$=3400 microseconds. When transistor 50 is not conducting, the primary voltage is allowed to flyback to plus 80 volts, and the output circuit D clamps at plus 3 volts maximum at point *a*, as previously explained. The flyback time of primary winding 32 under this condition, using the above stated formula, is approximately:

$$170V \times 20 \text{ microseconds} = 80V \times S_2$$

$S_2$=40 microseconds. Therefore, it can be seen that the frequency range of the power converter of this invention varies from 16,000 cycles per second unclamped, to 300 cycles per second when clamped.

The short circuit protection previously mentioned is made possible because the flyback output voltage at output winding 34 is clamped to about 1 volt because of power output diode 70 of output circuit D. This 1-volt clamp voltage reflects back to primary winding 32 as 20 volts because of the 20 to 1 turns ratio between windings 32 and 34. Using the previously stated formula, and substituting the approximate values therein, the flyback time under a short circuit condition equals 170 microseconds, or approximately 5200 cycles per second, well within the normal operating range of the power converter.

The rated power output of the power converter of this invention is a function of two parameters, conduction time and flyback time, neglecting component inefficiencies. By averaging the power input applied to transformer 30 during conduction time over one complete cycle (conduction time plus flyback time), keeping in mind that the oscillator frequency is being controlled so as to produce a specified output voltage and also that the turns ratio of windings 32 and 34 of transformer 30 is 20 to 1, the maximum power output for the embodiment shown can be easily computed.

Since the generated output voltage is controlled to a maximum of plus 3 volts at point *a*, and taking into account the 1-volt drop in diode 70, the generated output voltage in output winding 34 is held to plus 4 volts. With the indicated 20 to 1 turns ratio, the flyback voltage in primary winding 32 is a plus 80 volts. This flyback voltage of plus 80 volts results in the flyback time of 40 microseconds, as was previously computed.

Assuming a linearly increasing current in the oscillator B, the power input during conduction time is:

$$W_1 = \frac{I_s}{2} \times E$$

$$W_1 = \frac{1/2}{2} \times 170$$

$$W_1 = 42 \text{ watts input}$$

where:

$W_1$=input power during conduction
$I_s$=saturation current—transformer
E=pulse amplitude—saturation The computed maximum rated power output, therefore, is the 42 watts input averaged over the total cycle, 20 microseconds conduction time plus the 40 microseconds flyback time, or a total of 60 microseconds. Using the formula:

$$S_1 \times W_1 = (S_1 + S_2) \times W_0$$

$$20 \times 42 = (20 + 40) \times W_0$$

$W_0$=14 watts, approx., where:
$W_1$=input power during conduction
$S_1$=conduction time—saturation
$W_0$=output power
$S_2$=flyback time The actual measured output for the power converter shown is 13.6 watts which compares favorably to the computed value. The output power available to any attached load, under these conditions, measures approximately 5 watts, showing an overall efficiency of a little less than 40%. The greater power losses of varying percentages occur in output circuit D, comparison circuit E, and oscillator B, with the remaining losses being distributed throughout the rest of the circuit of the power converter.

Resistor 28 of oscillator B makes the power converter current limited, or better still, power limited. Maximum power output, or current, is controlled by adjusting the saturation current ($I_s$) of transformer 30 to a lower value than that requried to completely saturate transformer 30 by adding current feedback to oscillator B. This current feedback can be accomplished with the addition of resistance to resistor 28 which is in series with emitter 26 of transistor 20. Increasing the resistance of resistor 28 would thus lower the magnitude of the saturation current ($I_s$) of transformer 30, and thereby limit the power output of the power converter in the embodiment illustrated.

The output voltage at point *a* is not only limited to a maximum plus 3 volts, but should this voltage level tend to decrease because of the power demands of the load which may be attached to the terminal marked OUT, the power converter is unclamped so as to generate additional voltage with a frequency of oscillations dependent upon such power demands, as has been previously detailed.

When the voltage output at point *a* is at the rated plus 3 volts, transistors 50 is conducting because of the positive bias on its base, set by the voltage drop across resistor 52. Any voltage generated in the primary winding 32 is effectively clamped back to ground through suppression diode 54 and conducting transistor 50. This, in turn, effectively clamps any induced output voltage in output winding 34 to approximately ground.

Therefore, to permit oscillator B to oscillate at any frequency other than its clamped frequency, conduction in transistor 50 must be stopped so that the flyback voltage generated in primary winding 32 will be unclamped, and thus induce output voltage pulses in output winding 34. How this is accomplished will now be detailed.

The output voltage at terminal OUT is sampled by comparison circuit E, wherein it is compared in a comparator with a voltage reference level set by Zener diode 104. When the power converter output voltage is lower than the voltage reference level set by Zener diode 104, the comparator puts out a signal to unclamp oscillator B, to thereby increase the voltage being applied to the load which may be attached to the converter by permitting the oscillator to generate voltage pulses.

Comparator E uses a conventional differential amplifier 77 which includes PNP transistors 80 and 90 with associated circuitry. Normally, when the output voltage is at the rated level set by Zener diode 104, transistor 80 is cut off and transistor 90 is conducting, and the voltage signal level at the collector of transistor 90 and resistor 94 is at some positive level (i.e., binary "1") with respect to ground, and no unclamping signal for oscillator B is generated. Transistor 100 is also conducting at this time.

Transistor 100 is used to amplify the reference voltage set by Zener diode 104, with the effects of temperature on transistor 100 compensating for the effects of temperature on Zener diode 104, to thereby provide an amplified reference voltage which is stable over a wide temperature range.

When the output voltage at terminal OUT goes down below the rated reference level, the bias set by resistors 82, 84, 86 on the base of PNP transistor 80 goes negative, moving the voltage level of the base of transistor 80 towards the voltage level of the collector. The bias to the base of PNP transistor 90 goes positive at this time, since conduction through transistor 100 decreases, moving the base voltage level of transistor 90 away from its collector voltage level. The resultant negative bias on the base of transistor 80, made adjustable by variable resistor 84, causes transistor 80 to conduct, and as conduction takes place in transistor 80, conduction in transistor 90 is cut off. Cutting off conduction in transistor 90 produces a negative going, or binary "0," signal at the junction of the collector of transistor 90 and resistor 94. This negatively produced, or binary "0" signal, serves to turn on NOR latch 111 through input unit 112.

NOR latch 111 is a standard four NOR latch circuit with the second and third NOR units wired in latch-back fashion, with each individual NOR unit having two input leads. Under clamping conditions, NOR latch 11 is reset, and there is a binary "1" signal from the collector of transistor 90 impressed on input unit 112, whose two input leads are tied together, and there is a binary "1" output signal from output unit 118 which forward biases the base of NPN transistor 120 to cause transistor 120 to conduct. With conduction through transistor 120, the base of NPN transistor 50 is forward biased because of the positive voltage drop across resistor 52. As was previously explained, it is the conduction of transistor 50 that clamps any flyback voltage generated in primary winding 30 back to ground.

For each NOR unit, no binary "1" signal on one input lead, nor on the second input lead, results in a binary "1"

output signal from that NOR unit. Consequently, impressing a binary "0" signal on both input leads to input unit 112, which signal was generated by the differential amplifier 77 when the output voltage from output circuit D went below the prescribed reference level, produces an output binary "1" signal instead of the reset binary "0" signal from unit 112, and such binary "1" output signal is impressed on one input of second unit 114. Second unit 114 had been previously reset with two binary "0" signal inputs thereto, and with a binary "1" output signal therefrom impressed upon one input lead to third unit 116. Changing one input signal to second unit 114 from a binary "0" signal to a binary "1" signal now produces a binary "0" signal output from second unit 114. This binary "0" output signal from second unit 114 puts a binary "0" signal on one input lead to third unit 116. Since the other input lead to third unit 116 had a binary "0" signal thereon from the reset circuit which includes transistor 130, the binary "0" signals on both input leads of third unit 116 now produces a binary "1" signal therefrom.

The newly produced binary "1" signal from third unit 116 serves as a latch-back to one input lead of second unit 114 to keep the output signal from second unit 114 as a binary "0" signal even after the initiating binary "0" signal from differential amplifier 77 into input unit 112 has changed its state back to a binary "1" condition.

This newly produced binary "1" signal from third unit 116 is also impressed upon the two input leads to output unit 118, as previously detailed, thereby changing the output signal of unit 118 from a binary "1" signal to a binary "0" signal. Since the output lead of unit 118 is wired to the base of normally conducting NPN transistor 120, changing the output signal from unit 118 from a binary "1" signal to a binary "0" signal removes the forward biasing potential on the base of transistor 120 thereby stopping conduction in transistor 120.

Stopping conduction in transistor 120 opens the circuit from resistor 122, connected to output terminal OUT, to resistor 52 in the base biasing circuit of transistor 50. Opening this circuit stops current flow through resistor 52, thereby removing the forward biasing potential to the base of transistor 50, stopping conduction therein. With no conduction in transistor 50, primary winding 32 is no longer clamped back to ground, and an output voltage pulse from the power converter can again be generated.

Output voltage pulses are produced by oscillator B at a frequency that increases the output voltage level to the prescribed level. When the output voltage again reaches the prescribed voltage level, the bias on the base of PNP transistor 80 goes positive, and the bias on the base of PNP transistor 90 is caused to go negative because of forward biasing transistor 100 into heavier conduction again. Increasing the voltage on plus line P sufficiently raises the base bias voltage across resistor 106 to transistor 100 so as to cause the heavier conduction therein.

Zener diode 104 is normally operating near the knee of its characteristic curve in the embodiment shown. One of the characteristics of a Zener diode, when it is so operating, is that a small variation of applied voltage will cause a breakdown within the Zener diode and heavy current will then flow through it. Therefore, with Zener diode 104 operating near the knee of its characteristic curve, the small voltage rise across resistor 106 is all that is needed to cause breakdown in Zener diode 104, thereby increasing the current through it so as to raise the forward bias on the base of transistor 100 sufficiently to cause heavier conduction therein.

With the increased conduction through transistor 100, the bias on the base of NPN transistor 90, set by the current conduction across resistor 96, will go negative, moving the base voltage level toward the collector voltage level, and thus cause conduction in transistor 90. Causing conduction in transistor 90 stops conduction in transistor

80, and also causes the output signal level at the collector of transistor 90 to return to the binary "1" state, thus removing the initiating binary "0" signal to NOR latch 111.

NOR latch 111 is incorporated within the power converter to insure that once the converter is unclamped, it remains unclamped until oscillator B has been triggered and transformer 30 has had time to charge and to flyback. This latching was incorporated to prevent clamping transistor 50 from having to operate at too high a rate (more than once per cycle) and thus overheat. Also, clamping transistor 50 is held nonconducting for three to five microseconds after oscillator B has finished conduction to insure that the initial surge currents have disappeared. Thus, clamping transistor 50 is again protected from over heating, this time being protected from the high surge currents.

Once having been impulsed into operation, NOR latch 111 must be reset to return the power converter to the clamped condition. This is done with a reset circuit, which includes transistor 130, on the cycle that the signal into input unit 112 changes from the binary "0" state back to the binary "1" state. When transistor 130 is normally nonconducting the output signal from this NOR latch reset circuit into third unit 116 is a binary "0" signal. As long as oscillator B is powered, negative voltage pulses are generated from output winding 34 of about 8 volts (caused by induction from each negative charge in the primary winding 32) and passed through negative facing diode 136 onto the emitter of transistor 130. These negative signals on the emitter of transistor 130 cause the bias on the base of transistor 130 to go positive with respect to the emitter, thus forward biasing transistor 130 into conduction. Transistor 130 will conduct as long as the output voltage from output winding 34 is negative, charging capacitor 142 with a negative voltage.

When oscillator B is unclamped, every time flyback takes place within transformer 30, the voltage from output winding 34 goes positive, cutting off conduction within transistor 130 because of diode 136, and capacitor 142 discharges, creating a positive going or binary "1" signal of short duration that is impressed upon the reset input of third unit 116 of NOR latch 111. As a consequence, binary "0" output signals of short duration are produced from unit 116. Normally, resetting of latch 111 cannot take place with these binary "0" output signals of short duration because these binary "0" output pulses cannot change the status of second unit 114 because of the binary "1" signal into second unit 114 from input unit 112. Therefore, when the short binary "1" signals caused by the discharge of capacitor 142 are no longer present, the binary "0" signal on the second input to third unit 116 returns the output signal from unit 116 back to the binary "1" state.

The binary "1" reset signal from discharging capacitor 142 into third unit 116, on the cycle that the initiating signal into unit 112 is no longer present, causes the output signal from unit 116 to remain changed from the binary "1" state to the binary "0" state. This is because the output signal from unit 112 into second unit 114 has changed back to the binary "0" state, and the latch-back from unit 116 into unit 114 can now change the status of unit 114. The binary "0" output signal from third unit 116 appearing on this cycle, latches back to an input of second unit 114, and can now change the output signal from second unit 114 from a binary "0" back to a binary "1" because a coincidence of binary "0" signals into both inputs of unit 114. The binary "1" output signal from second unit 114, in turn, latches back to an input of third unit 116 so as to keep the output signal from third unit 116 in the binary "0" reset state. A binary "0" output signal from unit 116 into output unit 118 changes the output signal from unit 118 from a binary "0" state back to a binary "1" state.

With the binary "1" signal from unit 118 again on the base of NPN transistor 120, transistor 120 is forward biased into conduction. With transistor 120 conducting, the base of NPN transistor 50 is again forward biased by the plus voltage drop across resistor 52 caused by conducting through resistor 52, transistor 120 and resistor 122. Forward biasing transistor 50 causes it to conduct and whenever transistor 50 conducts, as previously indicated, any flyback voltage from primary winding 32 is clamped back to ground and no voltage pulses are generated by oscillator B.

As previously indicated, FIGS. 4A through 4C are illustrative of the operating frequencies of the power converter of this invention, showing the voltage wave form at point *a* for loads of varying power requirements. Various structural modifications can be made in the preferred embodiment of the present invention as disclosed in the drawings without departing from the spirit and scope of the appended claims.

What is claimed is:

1. A power supply circuit comprising:
means defining a blocking oscillator for producing a series of oscillating voltage pulses, said oscillator operating at an upper frequency F2 when operating under its free running condition and operating at a lower frequency F1 when operating under a clamped condition;
actuatable oscillator control means normally clamping said oscillator and, upon actuation, for unclamping said oscillator to thereby vary the frequency of said oscillator over a frequency range between F1 and F2;
output circuit means coupled to said oscillator for providing an output voltage level therefrom, said circuit means adapted to be coupled to a load which affects the character of said output voltage level in dependence upon the power consumption of said load;
comparison means coupled to said output circuit means for comparing said output voltage level with a reference voltage level and for actuating said oscillator control means each time said output voltage level differs from said reference voltage level;
said oscillator control means includes at least a transistor and a transistor control circuit means connected between said oscillator and said comparison means, said transistor control circuit means being responsive to actuation by said comparison means each time said output voltage level differs from said reference voltage level; and, said oscillator control means includes a rectifier means for suppressing said oscillations, said rectifier means being connected to said transistor.

2. The power supply circuit as set forth in claim 1 wherein said oscillator includes a primary winding connected to said rectifier means, said rectifier means including at least a second semiconductor.

3. A power supply circuit comprising:
means defining a blocking oscillator for producing a series of oscillating voltage pulses, said oscillator operating at an upper frequency F2 when operating under its free running condition and operating at a lower frequency F1 when operating under a clamped condition;
actuatable oscillator control means normally clamping said oscillator and, upon actuation, for unclamping said oscillator to thereby vary the frequency of said oscillator over a frequency range between F1 and F2;
output circuit means coupled to said oscillator for providing an output voltage level therefrom, said circuit means adapted to be coupled to a load which affects the character of said output voltage level in dependence upon the power consumption of said load;
comparison means coupled to said output circuit means for comparing said output voltage level with a reference voltage level and for actuating said oscillator control means each time said output voltage level differs from said reference voltage level;
said oscillator control means includes at least a transistor and a transistor control circuit means connected between said oscillator and said comparison means, said transistor control circuit means being responsive to actuation by said comparison means each time said output voltage level differs from said reference voltage level; and, said comparison means includes a voltage sensing means for sensing said output voltage level, a voltage reference setting means connected thereto for producing said reference voltage level, and a latching circuit means also connected to said voltage sensing means for actuating said oscillator control means each time said output voltage level differs from said reference voltage level.

4. The power supply circuit as set forth in claim 3 wherein said voltage sensing means produces an actuating signal whenever said output voltage level differs from said reference voltage level, said latching circuit means being responsive to said actuating signal, and when so responsive, said latching circuit means actuating said oscillator control means which in turn then activates said oscillator.

5. The power supply circuit as set forth in claim 4 wherein said latching circuit means includes a reset means for resetting said latching circuit means after said oscillator control means has activated said oscillator.

6. The power supply circuit as set forth in claim 5 wherein said oscillator includes an output winding, said reset means including an electronic control means connected to said output winding.

7. The power supply circuit as set forth in claim 5 wherein said reference setting means includes a Zener diode.

8. A power supply circuit comprising:
an oscillator circuit including a first transistor, a pulse transformer having a primary winding connected to the collector of said first transistor and a feedback winding connected to the base of said first transistor and an output winding wherein a series of output voltage pulses is generated when said oscillator is activated, an input circuit including at least a rectifier and a resistor, said feedback winding being connected between said input circuit and said first transistor;
an actuatable oscillator control circuit activating said oscillator circuit so as to control the frequency of operation of said oscillator circuit including a second transistor and at least a rectifier, said rectifier being connected between said primary winding and the collector of said second transistor, and a bias circuit connected with the emitter and base of said second transistor;
an output circuit coupled to said output winding including means for permitting the output voltage pulses generated in said output winding to flow in only one direction in said output circuit, said output circuit having an output voltage limited to a predetermined voltage level and adapted to power a load which may be variable; and
a comparison circuit including a reference setting circuit connected to said output circuit, a latching circuit connected between said reference setting circuit and the base of said second transistor of said oscillator control ciricuit, and a reset circuit connected between said output winding and said latching circuit, said reset circuit having at least a third transistor, said reference setting circuit having a means for setting a predetermined voltage level for comparison with said output voltage level of said output circuit to sense a differentiation between said voltage levels and producing a voltage signal upon said differentiation, said voltage signal actuating said latching circuit so as to produce an actuating signal therefrom, said actuating signal actuating said oscillator control means so as to change the bias on the base of said second transistor to thereby activate said oscillator circuit, whereby said oscillator is activated for each differentiation between said voltage levels so as to vary the frequency of voltage pulses produced therefrom between an upper frequency when free running and a lower frequency, whichever operating frequency is necessary to maintain said output voltage of said output circuit at the predetermined voltage level set by said reference setting circuit so as to meet the power requirements, up to the rated power output, of any load which may be connected thereto.

References Cited

UNITED STATES PATENTS

| | | | |
|---|---|---|---|
| 3,256,494 | 6/1966 | Reiner | 331—112 |
| 3,302,130 | 1/1967 | Minks | 331—112 |
| 3,427,525 | 2/1969 | Thornwall | 321—2 |

ROY LAKE, Primary Examiner

S. H. GRIMM, Assistant Examiner

U.S. Cl. X.R.

307—297; 321—2, 18; 331—112, 148, 177, 183